(12) United States Patent
Dugan et al.

(10) Patent No.: US 10,705,891 B2
(45) Date of Patent: Jul. 7, 2020

(54) COGNITIVE AGENT FOR PERSISTENT MULTI-PLATFORM REMINDER PROVISION

(71) Applicant: International Business Machines Corporation, Armonk, NY (US)

(72) Inventors: Casey Dugan, Cambridge, MA (US); Michael Muller, Cambridge, MA (US); Aabhas Sharma, Cambridge, MA (US); James Johnson, Cambridge, MA (US); Werner Geyer, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/171,894

(22) Filed: Oct. 26, 2018

(65) Prior Publication Data

US 2020/0133745 A1    Apr. 30, 2020

(51) Int. Cl.
| | | |
|---|---|---|
| *G06F 3/00* | (2006.01) | |
| *G06F 9/54* | (2006.01) | |
| *H04L 29/08* | (2006.01) | |
| *H04W 4/02* | (2018.01) | |
| *H04W 4/021* | (2018.01) | |

(52) U.S. Cl.
CPC ............ *G06F 9/542* (2013.01); *H04L 67/22* (2013.01); *H04W 4/021* (2013.01); *H04W 4/025* (2013.01); *H04L 67/10* (2013.01)

(58) Field of Classification Search
CPC ...................................................... G06F 9/542
USPC ......................................................... 719/318
See application file for complete search history.

(56) References Cited

U.S. PATENT DOCUMENTS

| | | | |
|---|---|---|---|
| 9,092,753 B1* | 7/2015 | Fanelli | G06Q 10/109 |
| 2003/0014292 A1* | 1/2003 | Strubbe | G06Q 10/109 |
| | | | 702/178 |
| 2005/0221820 A1 | 10/2005 | Ruetschi | |
| 2008/0293392 A1* | 11/2008 | Strother | H04M 3/5158 |
| | | | 455/414.2 |
| 2013/0145024 A1* | 6/2013 | Cao | H04L 67/22 |
| | | | 709/224 |
| 2013/0290710 A1* | 10/2013 | Broder | H04L 63/102 |
| | | | 713/168 |
| 2013/0329527 A1 | 12/2013 | Alavala et al. | |
| 2014/0114716 A1* | 4/2014 | Flogel | G06Q 10/1095 |
| | | | 705/7.19 |
| 2014/0243021 A1* | 8/2014 | Lerenc | H04W 4/027 |
| | | | 455/456.3 |
| 2015/0081321 A1* | 3/2015 | Jain | G06F 19/3456 |
| | | | 705/2 |

OTHER PUBLICATIONS

S. Adah, Query Caching and Optimization in Distributed Mediator Systems (Year: 1996).*

(Continued)

*Primary Examiner* — Lechi Truong
(74) *Attorney, Agent, or Firm* — Anthony R. Curro, Esq.; McGinn IP Law Group, PLLC (57) ABSTRACT

A reminder method, system, and computer program product include collecting information and an activity of a user, determining an optimum time to send the reminder to the user based on the information and the activity of the user and an optimal platform to deliver the reminder to the user based on the information and the activity of the user.

11 Claims, 4 Drawing Sheets

(56) References Cited

OTHER PUBLICATIONS

Mel, et al. "The NIST Definition of Cloud Computing". Recommendations of the National Institute of Standards and Technology. Nov. 16, 2015.

\* cited by examiner

COGNITIVE AGENT FOR PERSISTENT MULTI-PLATFORM REMINDER PROVISION

BACKGROUND

The present invention relates generally to a reminder method. More particularly, but not by way of limitation, the present invention relates to a system, method, and computer program product for generating reminders by taking into account multiple data sources including but not limited to calendar entries, SameTime® messages, Slack® messages, as well as a user's location behavior.

Remembering to perform a pending task at the appropriate time can be a priceless supplement to any person's daily productivity. However, an optimized solution to this problem would have to be a multiplatform effort. Conventional techniques merely operate in on modality or on one platform.

Therefore, there is needed a reminder assistant that considers a combination of cognitive tools and technologies that converge into a cognitive agent designed to remind the user of a pending activity at the optimum time, on the optimal platform, and at a location.

SUMMARY

In an exemplary embodiment, the present invention can provide a computer-implemented reminder method for performing a respective action, the method include collecting information and an activity of a user, determining an optimum time to send the reminder to the user based on the information and the activity of the user, and an optimal platform to deliver the reminder to the user based on the information and the activity of the user. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-4, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
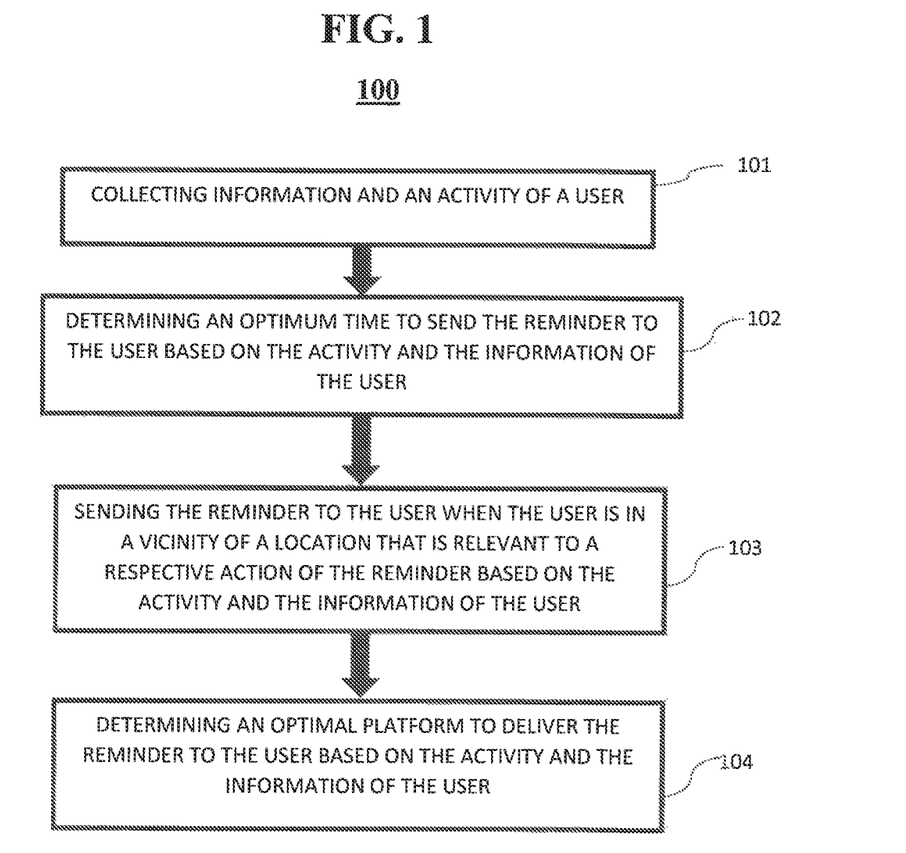
FIG. 1 exemplarily shows a high-level flow chart for a reminder method 100 according to an embodiment of the present invention.

By way of introduction of the example depicted in FIG. 1, an embodiment of a reminder method 100 according to the present invention can include various steps for generating platform independent reminders that appear at times, across platforms, and locations optimized for a specific user to be able to complete their pending identified tasks.

Figure 2:
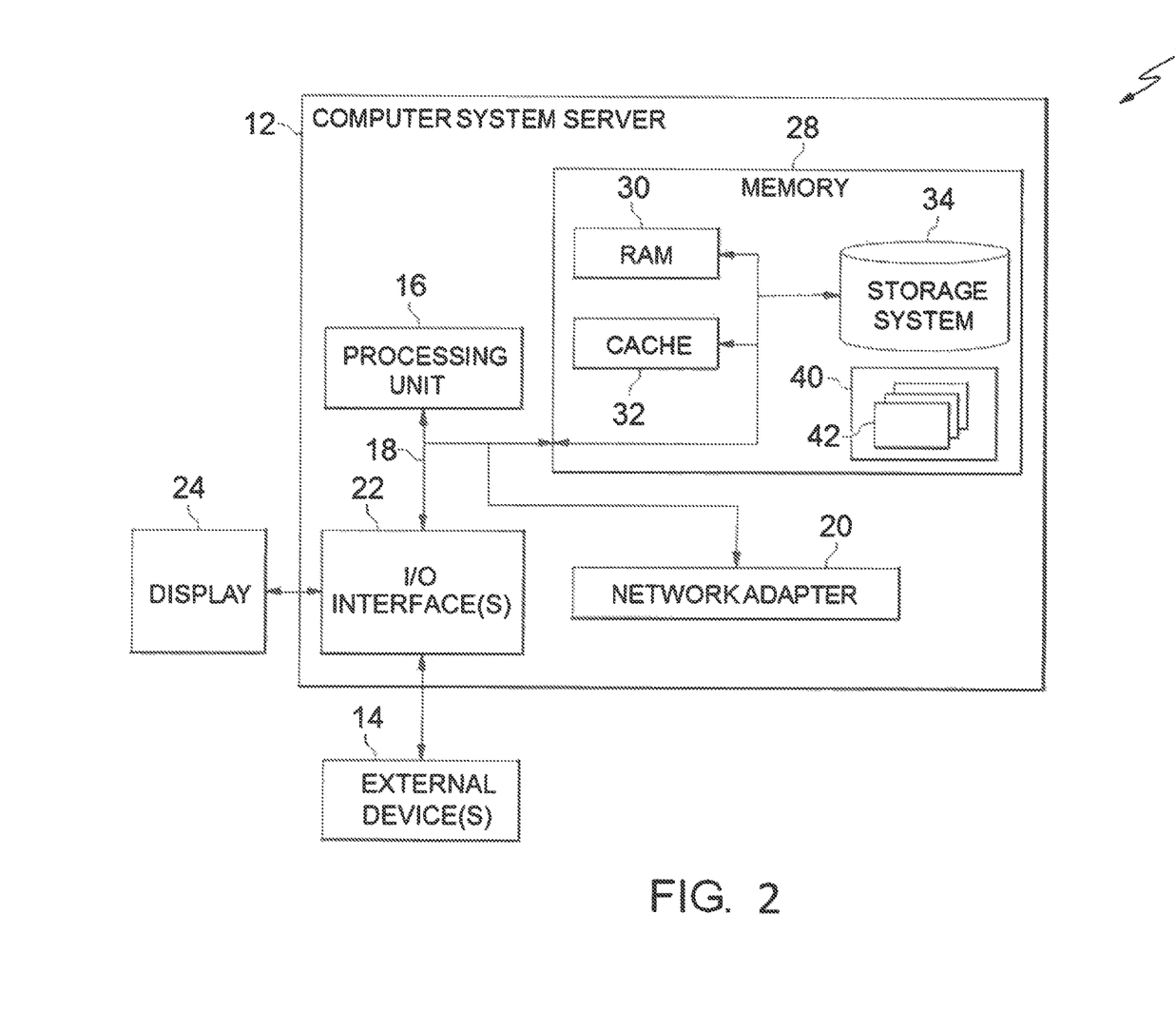
FIG. 2 depicts a cloud-computing node 10 according to an embodiment of the present invention.

By way of introduction of the example depicted in FIG. 2, one or more computers of a computer system 12 according to an embodiment of the present invention can include a memory 28 having instructions stored in a storage system to perform the steps of FIG. 1.

With reference to FIG. 1, in step 101, information and an activity of a user is collected. The information and an activity can be collected from multiple sources. For example, the information and the activity of the user can be collected from metadata of a user's online presence, e-mail communications, text messages, sensor data (e.g., audio, visual, health information, etc.), a user's location information (e.g., from a global positioning service (GPS), FourSquare®, Facebook® location, or other tracking), calendar entries, activity on social media platforms, etc.

With the obtained information and activity of the user, an analysis is performed by an algorithm that includes actions that the user needs to perform to determine a time by when these actions need to be performed, the key stakeholders (and the user's relationship with the stakeholder such as how frequently the user interacts with a stakeholder, the average response times during an interaction between the user and each of the other stakeholders, etc.) involved in each individual action, parties that need the completed action as well as parties that would have to be involved in order to complete the respective action, and the location (if any) pertaining to the completion of each action. It is noted that the stakeholder includes the other party to the action (e.g., a meeting includes the user and the stakeholder).

Once the algorithm has obtained all of the above analysis, the method 100 can understand the dependencies of an action with all the above analysis points, break down a given action into sub-actions, and link them to stakeholders, locations, meetings, message platforms, etc. This way, the method 100 via steps 102-104 comes up with a series of appropriate reminder messages based on a location, a time, and a platform to generate an optimal reminder for the user to complete the action.

That is, via steps 102-104 and based on the information and the activity of the user compiled by an algorithm (e.g., such as machine learning), the method can identify the upcoming interactions between a user and the above mentioned factors including the user being at the relevant location, the user meeting the relevant stakeholder, and any relevant interaction (email, message) across the user's social platforms etc. The method can then present the previously created reminders to the user at the identified optimum times, locations and platforms.

In step 102, an optimum time is determined to send the reminder to the user based on the activity and the information of the user. For example, some users require ample time to prepare for an action and the reminder should be optimally sent days before. Other users respond better to last minute reminds. According to the activity and information of the user, the algorithm can determine for each user the optimal time for each task by considering all data as well as considering the data of the stakeholder on the other end of the action. For example, if action is a meeting and the other person in the meeting is typically over prepared, an early reminder can be sent so that the user has more time to prepare and thus not be less prepared than the counterpart does. Or, the reminder can be sent based on the user's attention span at different times of the day. For example, in one embodiment, a user may typically ignore all communications after their lunch break. Therefore, the reminder can be optimally sent prior to their lunch break or at a time after the lunch break when the user stops ignoring reminders.

In step 103, the reminder is sent to the user when the user is in a vicinity (e.g., close to) of a location that is relevant to a respective action of the reminder based on the activity and the information of the user.

For example, if the action is "pick up milk on the way home", the reminder can be sent to the user when the user is leaving their work and approaching their car. Similarly, the reminder can be sent when the user is on a route that they travel that passes by a store which sells milk. That is, the vicinity of the location does not need to be where the action takes place but can include when the user is performing an activity (e.g., such as driving) that is conducive to optimally performing the action. As another example, the user can receive the reminder when the user is home rather than at work for a certain activity if in the past the user has a higher likelihood of completing the task if reminded at home. That is, the intent of the reminder based on a vicinity of the location that is relevant to the action is such that the user has a high likelihood to complete the action because they optimally receive the reminder.

In step 104, an optimal platform to deliver the reminder is determined based on the activity and the information of the user. For example, a user may ignore their cell phone when they are at work but closely monitor their work e-mail account. Thus, based on this activity and information, the reminder is optimally delivered to the user's work e-mail instead of their cell phone. In one embodiment, the reminder can be delivered to an associate of the user if the associate (e.g., an assistant) is responsible for planning the user's schedule. That is, the platform can include a different recipient of the reminder on a platform that is best for them such that the user will most likely perform the task. And, the platform can be a different software program on a same device such as delivering the reminder via Facebook® instead of e-mail or Twitter® instead of a text message.

Thus, steps 101-104 of the method 100 can provide for a method to generate platform independent reminders that appear at times and locations optimized for a specific user to be able to complete his/her pending identified tasks, including reminding the user to perform an action using multiple platforms including across different third party users related to the user (e.g., an assistant), reminding the user to perform actions or sub-actions in a timely fashion with respect to a user's interaction with other stakeholders (e.g., the reminders are dependent on the association with the other end of the action), reminding the user to perform actions or sub-actions upon reception of a relevant message on any of the multiple social platforms, and reminding the user to perform actions or sub-actions when they are in the vicinity of a location that is relevant to the respective action.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set-top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive or flash drive (e.g., a USB "thumb" drive), and an optical disk drive for reading from or writing to a removable, non-volatile optical disk such as a CD-ROM, DVD-ROM or other optical media can be provided. In such instances, each can be connected to bus 18 by one or more interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing device, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
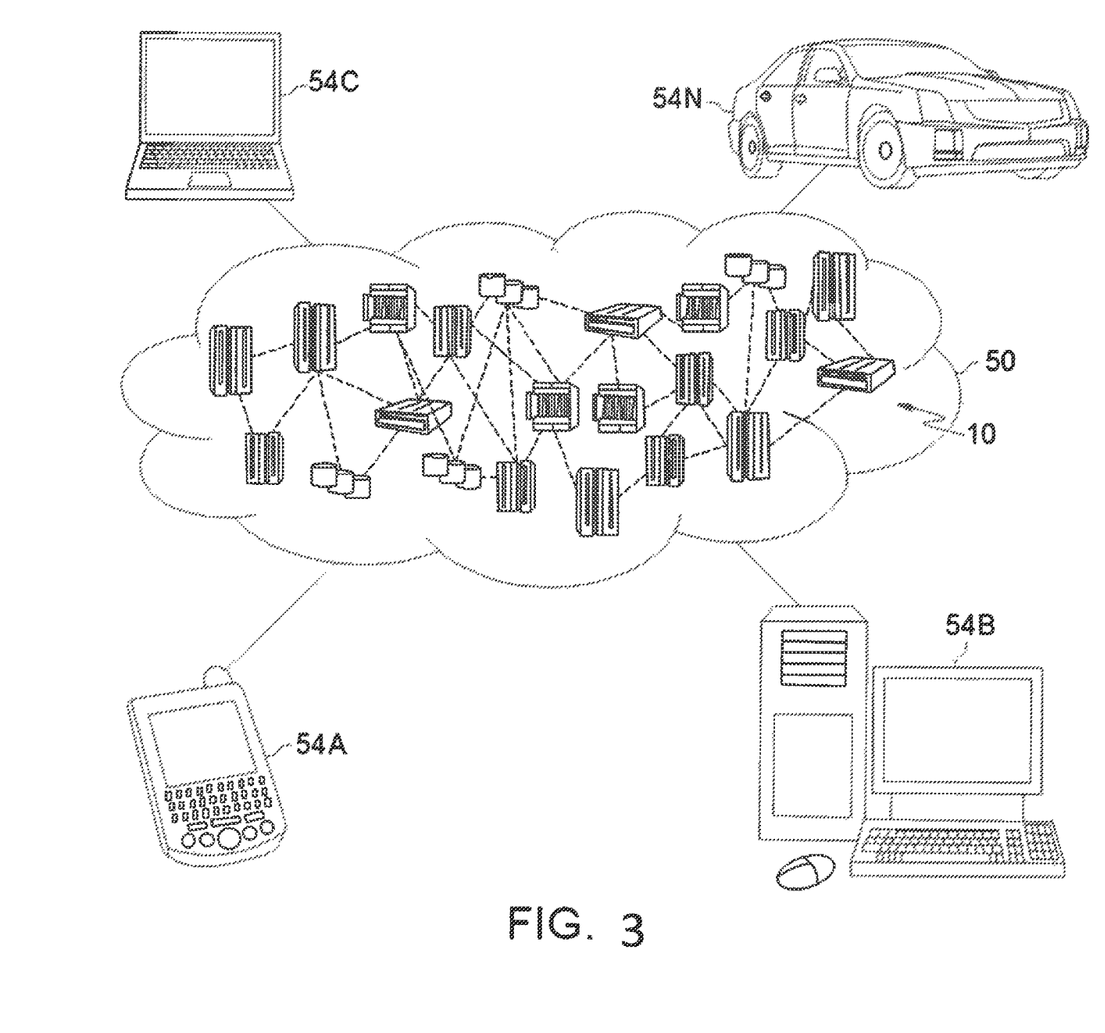
FIG. 3 depicts a cloud-computing environment 50 according to an embodiment of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources attached to a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
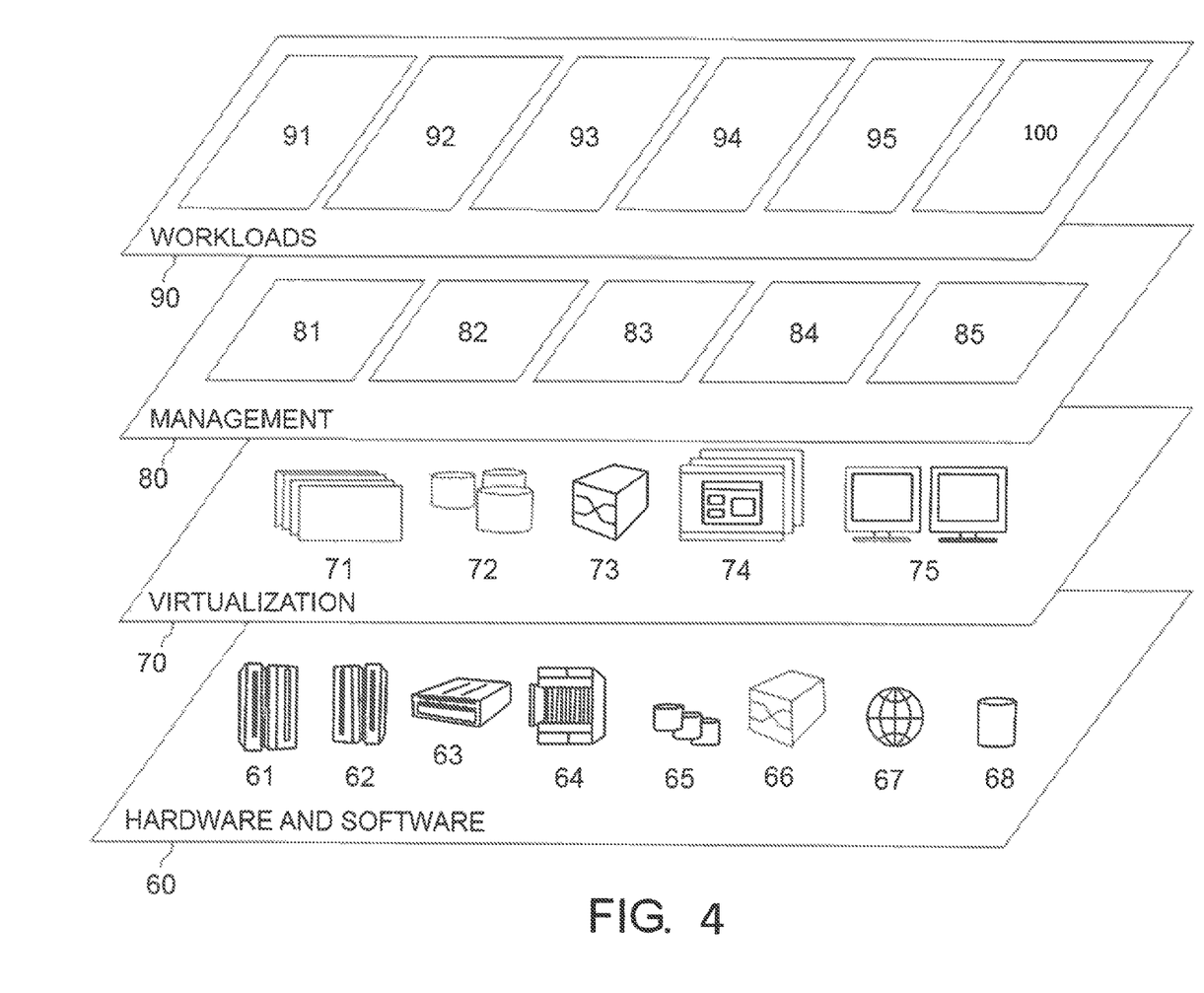
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development lifecycle management 92; virtual classroom education delivery 93; data analytics processing 94; transaction processing 95; and reminder method 100 in accordance with the present invention.

The present invention may be embodied as a system, a method, and/or a computer program product at any reasonable level of integration with workloads layer 90, management layer 80, virtualization layer 70, hardware and software layer 60, and cloud computing environment 50. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, or procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented reminder method for performing a respective action, the method comprising:
    collecting information, a location, and an activity of a user with respect to a second user; and
    determining:
        an optimum time to send the reminder to the user based on the information, the location, and the activity of the user; and
        an optimal platform to deliver the reminder to the user based on the information, the location, and the activity of the user,
    wherein the information includes data regarding an interaction of the user with a stakeholder in the respective action,
    further comprising sending the reminder to the user when the user is in a vicinity of the location that is relevant to the respective action of the reminder based on the information and the activity of the user,
    wherein the vicinity of the location includes being in a vicinity of an object that assists in performing the respective action, and
    wherein the determining determines the optimum time and the optimal platform based on a past completion rate of a respective task when the reminder is delivered at a same time and on a same platform.

2. The computer-implemented method of claim 1, wherein the optimal platform includes one of:
    a software product configured to deliver the reminder; and
    a third party user associated with the user, and
    wherein determining the optimal platform includes considering a past behavior of the user at a same time of the reminder.

3. The computer-implemented method of claim 1, wherein the location includes the location of the stakeholder other than the user in the respective action.

4. The computer-implemented method of claim 1, wherein further comprising aggregating the information and the activity of the user together in order to detect optimal conditions for the user to complete the respective action.

5. The computer-implemented method of claim 1, embodied in a cloud-computing environment.

6. A computer program product for reminder for a respective action, the computer program product comprising a computer-readable storage medium having program instructions embodied therewith, the program instructions executable by a computer to cause the computer to perform:
- collecting information, a location, and an activity of a user with respect to a second user; and
- determining:
  - an optimum time to send the reminder to the user based on the information, the location, and the activity of the user; and
  - an optimal platform to deliver the reminder to the user based on the information, the location, and the activity of the user,
- wherein the information includes data regarding an interaction of the user with a stakeholder in the respective action,
- further comprising sending the reminder to the user when the user is in a vicinity of the location that is relevant to the respective action of the reminder based on the information and the activity of the user,
- wherein the vicinity of the location includes being in a vicinity of an object that assists in performing the respective action, and
- wherein the determining determines the optimum time and the optimal platform based on a past completion rate of a respective task when the reminder is delivered at a same time and on a same platform.

7. The computer program product of claim 6, wherein the optimal platform includes one of:
- a software product configured to deliver the reminder; and
- a third party user associated with the user.

8. The computer program product of claim 6, wherein the location includes the location of the stakeholder other than the user in the respective action.

9. The computer program product of claim 6, wherein further comprising aggregating the information and the activity of the user together in order to detect optimal conditions for the user to complete the respective action.

10. A reminder system, said system comprising:
- a processor; and
- a memory, the memory storing instructions to cause the processor to perform:
  - collecting information, a location, and an activity of a user with respect to a second user; and
  - determining:
    - an optimum time to send the reminder to the user based on the information, the location, and the activity of the user; and
    - an optimal platform to deliver the reminder to the user based on the information, the location, and the activity of the user,
  - wherein the information includes data regarding an interaction of the user with a stakeholder in the respective action,
  - further comprising sending the reminder to the user when the user is in a vicinity of the location that is relevant to the respective action of the reminder based on the information and the activity of the user,
  - wherein the vicinity of the location includes being in a vicinity of an object that assists in performing the respective action, and
  - wherein the determining determines the optimum time and the optimal platform based on a past completion rate of a respective task when the reminder is delivered at a same time and on a same platform.

11. The system of claim 10, embodied in a cloud-computing environment.

* * * * *